United States Patent
Buldorini et al.

(10) Patent No.: US 10,506,457 B2
(45) Date of Patent: Dec. 10, 2019

(54) METHOD FOR MANAGING WIRELESS COMMUNICATION NETWORKS BY PREDICTION OF TRAFFIC PARAMETERS

(71) Applicant: TELECOM ITALIA S.p.A., Milan (IT)

(72) Inventors: Andrea Buldorini, Turin (IT); Andrea Schiavoni, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 31 days.

(21) Appl. No.: 15/759,931

(22) PCT Filed: Sep. 30, 2015

(86) PCT No.: PCT/EP2015/072574
§ 371 (c)(1),
(2) Date: Mar. 14, 2018

(87) PCT Pub. No.: WO2017/054856
PCT Pub. Date: Apr. 6, 2017

(65) Prior Publication Data
US 2018/0262921 A1    Sep. 13, 2018

(51) Int. Cl.
*H04W 24/02* (2009.01)
*H04W 16/18* (2009.01)
(Continued)

(52) U.S. Cl.
CPC ........... *H04W 24/02* (2013.01); *H04W 16/18* (2013.01); *H04W 28/02* (2013.01); *H04W 24/08* (2013.01)

(58) Field of Classification Search
None
See application file for complete search history.

(56) References Cited

U.S. PATENT DOCUMENTS 6,246,880 B1     6/2001  Iizuka
9,900,395 B2 *   2/2018  James ................... H04L 67/22
(Continued)

FOREIGN PATENT DOCUMENTS

EP    0 883 067 A1   12/1998
GB    2461516 A      1/2010

OTHER PUBLICATIONS

International Search Report dated May 30, 2016 in PCT/EP2015/072574 filed Sep. 30, 2015.

*Primary Examiner* — Alpus Hsu
*Assistant Examiner* — Camquyen Thai
(74) *Attorney, Agent, or Firm* — Oblon, McClelland, Maier & Neustadt, L.L.P.

(57) ABSTRACT

A method for managing a wireless network includes collecting a sequence of traffic data samples and arranging the sequence of data samples in a level-0 residual matrix having a dimension corresponding to a time scale defining a time window. The method also includes performing a least one cycle of subdividing the matrix based on the time scale to form traffic sample sets, calculating a functional that fits each sample set, and calculating an approximation of each sample set. The method also includes joining together the approximations to form an approximated matrix and calculating the difference between the matrix and the approximated matrix. The method further forecasts a traffic data trend for another time window by generating predicted samples based on the previous calculations, and allocating resources of the wireless network based on the traffic data trend.

14 Claims, 3 Drawing Sheets

(51) Int. Cl.
*H04W 28/02* (2009.01)
*H04W 24/08* (2009.01)

(56) References Cited

U.S. PATENT DOCUMENTS

| | | | | |
|---|---|---|---|---|
| 2007/0208493 | A1* | 9/2007 | Downs | G08G 1/0104 |
| | | | | 701/117 |
| 2008/0225739 | A1* | 9/2008 | Toomey | H04L 43/022 |
| | | | | 370/252 |
| 2009/0245107 | A1* | 10/2009 | Krishnaswamy | H04L 41/142 |
| | | | | 370/232 |
| 2010/0302975 | A1* | 12/2010 | Klein | H04L 12/40013 |
| | | | | 370/255 |
| 2015/0228188 | A1* | 8/2015 | Macfarlane | G08G 1/0129 |
| | | | | 340/936 |
| 2015/0303953 | A1* | 10/2015 | Levitt | H04L 1/08 |
| | | | | 455/114.2 |

* cited by examiner

↑ days
└──→ quarter hours

METHOD FOR MANAGING WIRELESS COMMUNICATION NETWORKS BY PREDICTION OF TRAFFIC PARAMETERS

BACKGROUND OF THE INVENTION

Field of the Invention

The present invention generally relates to wireless telecommunication networks, such as cellular networks.

Overview of the Related Art

The characterization and prediction of data and voice traffic trend is an issue of fundamental importance in the design and optimization of cellular networks.

Specifically, the inherent nature of the traffic associated to the nodes/cells in a cellular network has different typological features depending on the spatial position wherein such nodes/cells are located (e.g., residential area, commercial area, business area, and so on) and depending on the time evolution of the traffic itself (e.g., deployment of a new technology, relocation/increase of local resources, and so on). In particular, the type of traffic associated with a node of the cellular network that is located in a urbanized business area is different from the type of traffic associated with a network node that is located in a urbanized residential area, or in a touristic area. As the time resolution increases, traffic data evolution becomes more and more irregular, even if a typical, basic traffic trend component (hereinafter referred to as "intrinsic component of the traffic trend", or briefly "intrinsic component") can be noticed. As an example, the cellular traffic data trend typically has a minimum during the middle of the night, which rises from early hours of the morning until stabilizing in the middle of the day. An extremely variable traffic component, or "random component" is superimposed on this intrinsic component.

The ability to extrapolate the behavior of historical data sequences (intended as collections of data sequentially gathered in various modes, from raw data output from the sampler to data that is pre-processed through, for example, filtering operations) in future periods has gained momentum in various disciplines such as economics (e.g., forecasting of stock prices trends or of macroeconomic parameters of a nation), biology (e.g., the evolution of epidemics) or engineering (for example, aging of the materials). The extrapolation of the behavior in future times of historical data sequences acquired in the past, unless there is further information about future dynamics, is generally and implicitly based on the assumption that the analyzed phenomena is stationary. Different known predictive techniques that rely on this type of assumption are used, such as for example:

techniques based on "spline" extrapolation in which the derivative is maintained from the extrapolation point (see for example Hyndman, King, Pitrun, Billah, "*Local linear forecast using cubic smoothing splines*", Aust. N.Z. Stat. 47(1), 2005, pages 87-99);

techniques based on neural networks in which each node learns from the behavior of the past (see for example Crone, Dhawan, "*Forecasting seasonal time series with neural networks: a sensitivity analysis of architecture parameters*", Proceeding of the international joint conference on neural networks, Orlando, Fla., USA, Aug. 12-17, 2007, or Gheyas, Smith, "*A neural network approach to time series forecasting*", Proceedings of the World Congress on Engineering 2009, Vol II, WCE 2009, Jul, 1-3, 2009, London, UK);

regressive techniques in which the more or less recent past is stored within weight parameters (see for example Barford, Kline, Plonka, Ron, "*A signal analysis of network traffic anomalies*", IMW'02, November 2002, Gelper, Fried, Croux, "*Robust forecasting with exponential and Holt-Winted smoothing*", Faculty of Economics and management, Katholieke Universitet Leuven, April 2007, or "*Single, Double and Triple exponential Smoothing*", NIST, http ://www.itl.nist-.gov/div898/handbook/pmc/section4).

In general, the processing of data through the predictive techniques mentioned above requires a sampling of the real data, that is, a process that detects the signal to be treated in discrete time instants outputting as a result data which may be the instantaneous reading of the sampled quantity or a processed version thereof between two successive time instants (for example, the average value over the interval of sampling). Which data, inherently, may be affected by noise, may undergo a filtering process (for example a moving average) and could not be fully in line with the requirements of the Nyquist theorem (i.e., the data is sampled with a frequency that is established by the same sampling system without making a pre-analysis of the observed quantity in order to define the bandwidth and therefore the sampling frequency).

Some of these techniques are best suited to be applied to phenomena represented by historical sequences with pre-defined characteristics (e.g., historical sequences with seasonal trends). To apply these techniques it is therefore necessary to have a knowledge or a pre-classification of the considered phenomena in order to select the best method: for example, some techniques require to determine the seasonality period through the observation of historical data, before starting the forecasting process.

Within this framework, the random component, to be understood in a broad sense, as the set of statistical variations of the phenomenon that can overlap the intrinsic component of the phenomenon itself, is an important element to consider.

If the intrinsic component was hidden by the random component, some predictive techniques may decrease in efficiency; in these cases, techniques such as spectral analysis or self/cross correlation processes could help in distinguishing the intrinsic component from the random component so as to separate the former from the latter. Applicant has observed that the random component can represent a significant component of the phenomenon under consideration, also for forecasting purposes. For example, in mobile telecommunications, the random component represents local variations from the intrinsic component due to predictable or unpredictable spot service requests. An example of an unpredictable local traffic increase could be generated by a queue of cars waiting on a road because of a car accident, while an example of a predictable local traffic increase could be due to a sporting event.

US patent application US20100030545 discloses a pattern shape predicting method comprising: predicting, with simulation, an intensity distribution of a pattern image concerning a pattern shape of a pattern on substrate formed on a substrate based on pattern data; calculating a first pattern edge position from the intensity distribution of the pattern image; calculating a feature value of the intensity distribution of the pattern image in a predetermined range including the first pattern edge position; calculating a fluctuation amount of the first pattern edge position from the feature value using a correlation; and predicting a second pattern edge position taking into account the fluctuation amount with respect to the first pattern edge position.

International patent application WO00/30385 discloses a method and system in a wireless communications system which enables a network operator to accommodate subscriber demands by matching resources to current, congested traffic levels and future, predicted traffic levels. The accommodation may be effectuated at the cell level, and the applicable resources include transceivers. A given base station in a network records variables on preferably at least three occasions. The variables include time of measurement, mean traffic level, busy hour TL, and current number of TRXs. These four variables may then be used in a non-linear optimization formula applied to a growth equation. Three vital coefficients are produced for the equation. Future traffic levels, as well as a maximum expected subscriber population, for the given cell can be estimated from the growth equation with the vital coefficients. A possible busy hour TL and the predicted future TLs may be used to determine an optimized number of TRXs.

Paper Dorgbefu, Gadze, Anipa, "*Short term traffic Volume prediction in UMTS networks using the Kalman Filter Algorithm*", International Journal of Mobile network Communications & Telematics, Vol. 3. No. 6. December 2013, describes a method for forecasting UMTS (Universal Mobile Telecommunications System) traffic through Kalman filtering techniques.

SUMMARY OF INVENTION

The Applicant has recognized that none of the abovementioned prior art documents provides a solution able to efficiently forecast traffic trend associated to the nodes/cells of a cellular network.

An aspect of the present invention provides for a method for managing a wireless network. The method comprises collecting a sequence of traffic data samples ordered in time, and arranging said collected data samples in at least one level-0 residual matrix having at least one dimension. Said dimension of said level-0 residual matrix corresponds to a respective time scale comprising an ordered sequence of time units. Said ordered sequences of time units define a first time window. The method further comprises performing at least once a cycle, each n-th iteration of the cycle, starting from n=0, comprising a sequence of phases A), B), C), D), E):

A) for at least one dimension of a level-(n) residual matrix, subdividing (110) the corresponding time scale in such a way to group the time units thereof in a respective level-(n+1) partition of time units so as to subdivide the traffic data samples in corresponding level-(n+1) traffic data sample sets;

B) for each level-(n+1) traffic data sample set, calculating (115) a corresponding functional which fits said level-(n+1) traffic data sample set;

C) for each level-(n+1) traffic data sample set, calculating (115) a corresponding approximation of the level-(n+1) traffic data sample set by applying the corresponding functional to the corresponding level-(n+1) partition of time units;

D) joining together (115) the approximations of the level-(n+1) traffic data sample sets to calculate a level-(n+1) approximated matrix, said level-(n+1) approximated matrix being an approximated version of the level-(n) residual matrix;

E) calculating (120) the difference between the level-(n) residual matrix and the calculated level-(n+1) approximated matrix so as to obtain a level-(n+1) residual matrix.

The method further comprises forecasting traffic data trend in a second time window different from the first time window by generating predicted data samples by applying the calculated functionals to a partition of time units comprising an ordered sequence of time units corresponding to at least one among said second time window and said first time window, and using said forecasted traffic data trend to manage the wireless network.

According to an embodiment of the present invention, said applying the calculated functionals to a partition of time units comprising an ordered sequence of time units corresponding to said second time window comprises applying the functionals calculated for level-(n+1) traffic data sample sets corresponding to a selected n-th iteration of the cycle.

According to an embodiment of the present invention, said calculating a functional which fits a level-(n+1) traffic data sample set comprises calculating the functional through a norm criteria over the traffic data samples of said level-(n+1) traffic data sample set.

According to an embodiment of the present invention, said calculating a functional which fits a level-(n+1) traffic data sample set comprises interpolating the traffic data samples of said level-(n+1) traffic data sample set.

According to an embodiment of the present invention, said functional is a plane that linearly interpolates the traffic data samples of said level-(n+1) traffic data sample set.

According to an embodiment of the present invention, said generating predicted data samples comprises applying the functionals to a partition of time units that extends outside the first time window.

According to an embodiment of the present invention, said generating predicted data samples comprises applying the functionals to a partition of time units inside the first time window and then shifting the results to a partition of time units that extends outside the first time window.

According to an embodiment of the present invention, said generating predicted data samples comprises transforming the traffic data samples of level-(n+1) traffic data sample sets by applying a transformation function thereto.

According to an embodiment of the present invention, said transforming the traffic data samples of level-(n+1) traffic data sample sets comprises multiplying each traffic data sample of the level-(n+1) traffic data sample sets by a scaling factor.

According to an embodiment of the present invention, said traffic data samples comprise values of parameters associated with traffic managed by the wireless network.

According to an embodiment of the present invention, said parameters comprise at least one among:
throughput;
dropped-call rate;
number of users connected to the wireless network, and
data volume.

Another aspect of the present invention relates to a system for the management of a wireless network. The system comprises a data acquisition module for acquiring traffic data samples; a processor for processing the acquired data samples in order to generate predicted data samples by performing the method according to any one among the preceding claims, and a terminal for providing a wireless network planner (270) with the generated predicted data samples.

According to an embodiment of the present invention, the data acquisition module is configured to sample and acquire the traffic data samples from the wireless network.

According to an embodiment of the present invention, the system further comprises a database storing historical traffic data samples, the data acquisition module being configured to acquire traffic data samples from said database.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein.

Figure 3A:
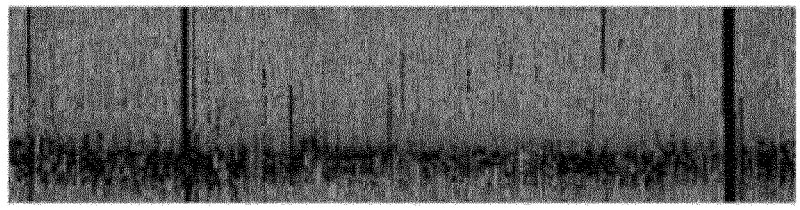
Figure 3B:
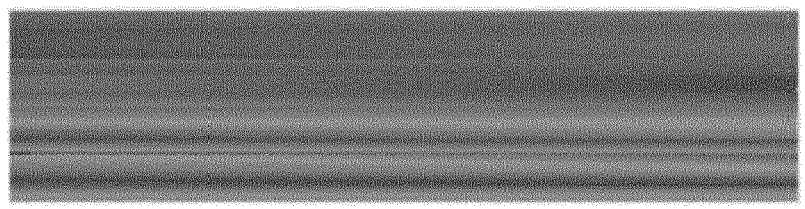
Figure 3C:
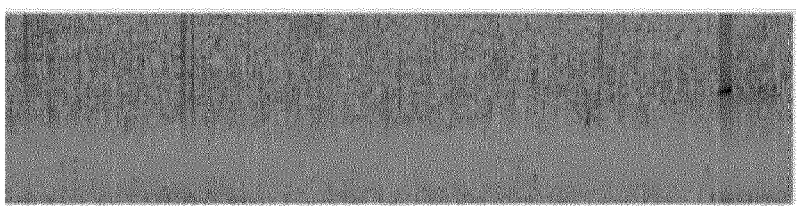
Figure 3D:
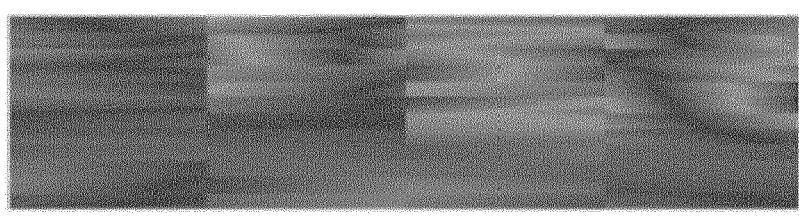
Figure 3E:
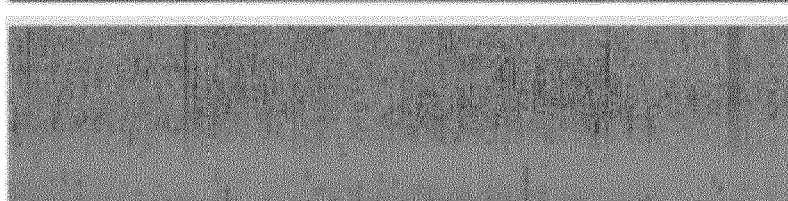
Figure 3F:
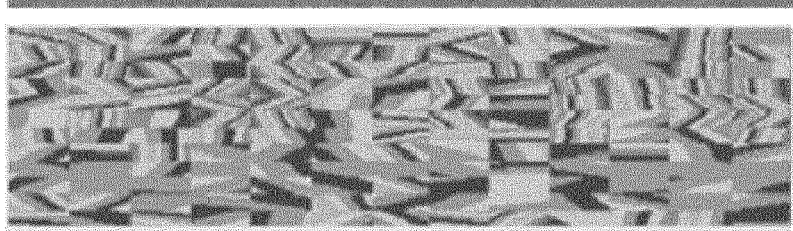
Figure 3G:
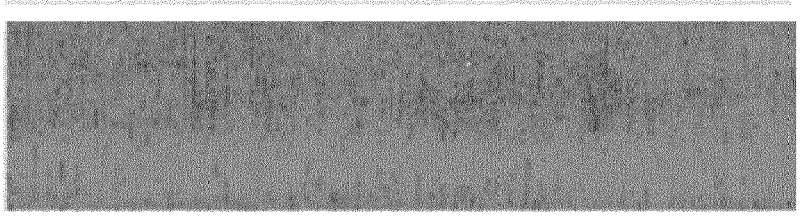
Figure 4A:
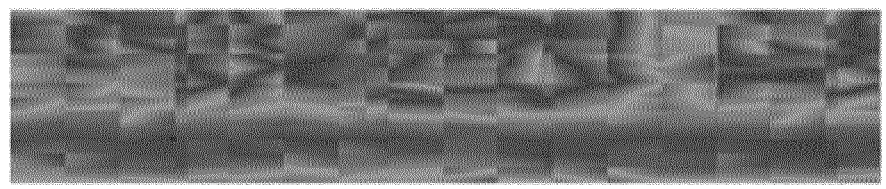
Figure 4B:
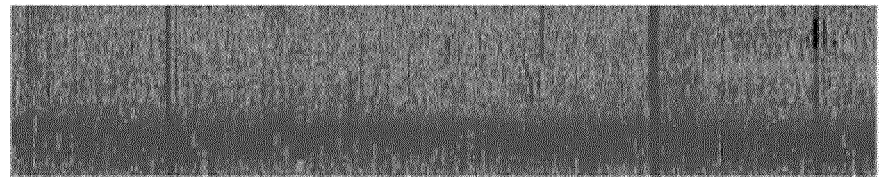

FIGS. 3A-3G graphically illustrate in terms of gray-scale various traffic distributions generated during an exemplary application of the method according to an embodiment of the present invention, FIGS. 4A and 4B graphically illustrate in terms of gray-scale forecasted traffic data trend generated using the traffic distributions illustrated in FIGS. 3A-3G.

DETAILED DESCRIPTION OF PREFERRED EMBODIMENTS OF THE INVENTION

Figure 1:
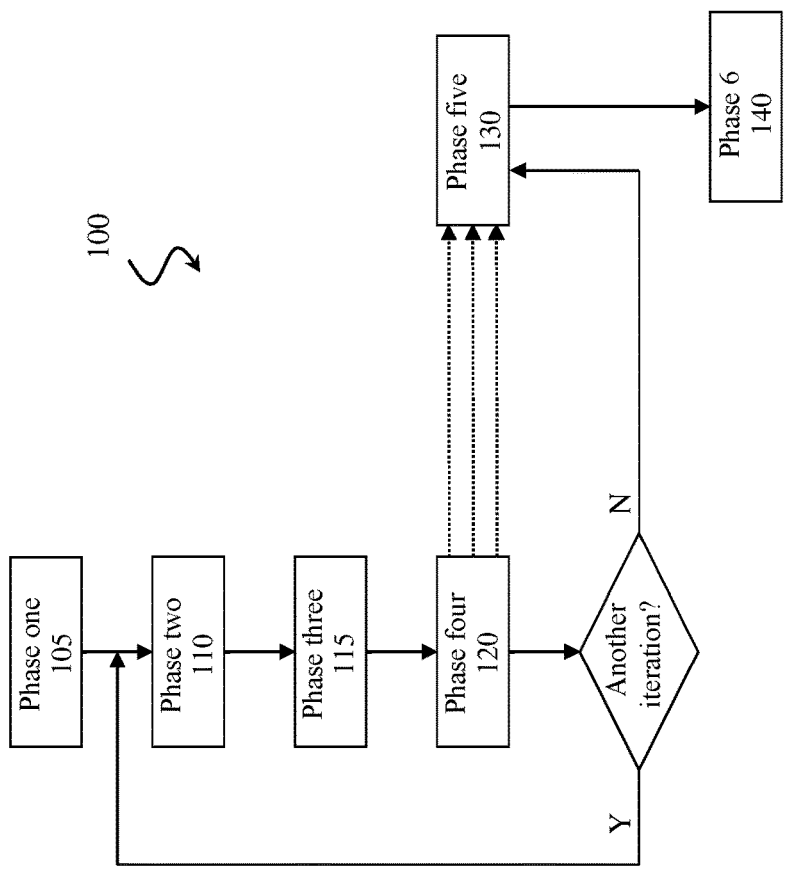
FIG. 1 is a flowchart of the main phases of a method for managing a wireless network according to an embodiment of the present invention.

FIG. 1 is a flowchart of the main phases of a method 100 for managing a wireless network, for example a cellular network, by forecasting future traffic trend associated to nodes/cells of said cellular network according to an embodiment of the present invention. The method 100 is configured to forecast the future traffic trend associated to nodes/cells of a cellular network starting from traffic data samples DS directly sampled from the cellular network in real time and/or from historical traffic data samples DS (for example taken from a database). In this description for traffic data samples DS it is intended values of at least one among a plurality of different parameters associated with the traffic generated/managed by (e.g., one or more nodes/cells of) the cellular network, such as for example: throughput, dropped-call rate, number of connected users, as well as data volume (e.g., expressed in Mbps).

The first phase of the method 100 of the present invention (block 105) provides for receiving a sequence of traffic data samples DS ordered in time, and for arranging said received traffic data samples DS in a corresponding k-dimensional matrix, referred to as level-0 Residual Matrix RR(0). Each dimension d (d=1, . . . , k) of the level-0 residual matrix RR(0) corresponds to a respective time scale representing an ordered sequence of time units. For example, the level-0 residual matrix RR(0) may be a two-dimensional matrix (k=2), with a first dimension (d=1) corresponding to a "day" time scale, in which each time unit corresponds to a day, and a second dimension (d=2) corresponding to a "quarter hour" time scale, in which each time unit corresponds to a quarter hour; in this case, each column of the level-0 residual matrix RR(0) may correspond to a respective day of a plurality of days, and each row of the level-0 residual matrix RR(0) may correspond to a respective quarter hour of a day (similar considerations can also be applied by exchanging the rows with the column).

For example, according to an embodiment of the present invention, if the sequence of traffic data samples DS covers a time period corresponding to a year, the level-0 residual matrix RR(0) comprises 365 columns (each one corresponding to a respective day of the year) and 96 rows (each one corresponding to a respective quarter hour of the day). In general, the traffic data samples DS of the sequence are arranged in the level-0 residual matrix RR(0) according to the time scales thereof. In particular, the generic traffic data sample DS sampled at the i-th quarter hour of the j-th day of the year is placed in the position corresponding to the i-th row and the j-th column of the level-0 residual matrix RR(0).

According to an embodiment of the present invention, if at least two sequences of traffic data samples DS are considered at the same time, each one corresponding to a different parameter associated with the traffic generated by the cellular network, each sequence is arranged in a respective different level-0 residual matrix RR(0).

The next phase of the method 100 according to an embodiment of the present invention (block 110) provides for subdividing the time scale corresponding to at least one of the k dimensions d of the level-0 residual matrix RR(0) in a first time division (hereinafter referred to as "level-1 time division"). According to an embodiment of the present invention, the level-1 time division provides for subdividing the time scale of at least one of the k dimensions d in one or more respective level-1 scale partitions $P_d(1)(i)$. By joining together all the level-1 scale partitions $P_d(1)(i)$ (i=1, 2, . . . ) corresponding to a dimension d, the original time scale of such dimension d is obtained.

Purpose of this phase is to subdivide the traffic data samples DS in corresponding traffic data samples DS sets $DS[P_{d=1}(1)(i) \times P_{d=2}(1)(j) \times \ldots \times P_{d=k}(1)(q)]$ so as to associate the appropriate granularity to the traffic data samples DS on the basis of the desired forecast analysis. It should be noted that the generic traffic data samples set $DS[P_{d=1}(1)(i) \times P_{d=2}(1)(j) \times \ldots \times P_{d=k}(1)(q)]$ comprises all the traffic data samples DS obtained by the combination of the i-th level-1 scale partition $P_{d=1}(1)(i)$ of the dimension d=1, the j-th level-1 scale partition $P_{d=2}(1)(j)$ of the dimension d=2, . . . , the q-th level-1 scale partition $P_{d=k}(1)(q)$ of the dimension d=k. The traffic data samples DS arrangement obtained after the level-1 time division is referred to as "level-1 characterization".

For example, making reference to the example at issue, wherein the number of dimensions k is equal to 2, the level-1 time division may provide for partitioning the 365 time units of the day time scale (d=1) in a single level-1 scale partition $P_1(1)(i=1)$ comprising all the 365 time units, and for partitioning the 96 time units of the quarter hour time scale (d=2) in 12 level-1 scale partitions $P_2(1)(j)$ (j=1, 2, . . . 12) of 8 quarter hours each. In the considered example, the level-1 characterization of the traffic data samples DS gives the traffic data samples a representation such to characterize the forecast analysis to focus on the annual traffic trend for every partition of 8 quarter of hours (corresponding to 2 hours).

The next phase of the method 100 according to an embodiment of the present invention (block 115) provides for approximating the data samples DS sets $DS[P_{d=1}(1)(i) \times P_{d=2}(1)(j) \times \ldots \times P_{d=k}(1)(q)]$ of the level-1 characterization in the following way.

For each data samples DS set $DS[P_{d=1}(1)(i) \times P_{d=2}(1)(j) \times \ldots \times P_{d=k}(1)(q)]$ corresponding to a level-1 partition $P_1(1)(i) \times P_2(1)(j) \times \ldots \times P_k(1)(q)$, a corresponding functional (i.e., scalar function) $\Psi(1)(i,j, \ldots ,q)$ is determined which fits said data samples DS set. The functional $\Psi(1)(i,j, \ldots ,q)$ is such that, when applied to the partitions P(1), it gives an approximation $DS'[P_{d=1}(1)(i) \times P_{d=2}(1)(j) \times \ldots \times P_{d=k}(1)(q)]$ of the data samples DS of the data sample set $DS[P_{d=1}(1)(i) \times P_{d=2}(1)(j) \times \ldots \times P_{d=k}(1)(q)]$.

According to an embodiment of the present invention, such functional $\Psi(1)(i,j,\ldots,q)$ may be determined through a norm criteria over the data sample DS of the data sample set $DS[P_{d=1}(1)(i) \times P_{d=2}(1)(j) \times \ldots \times P_{d=k}(1)(q)]$. The functional $\Psi(1)(i,j,\ldots,q)$ and the corresponding norm criteria can be defined on partition basis, i.e. they can be different functionals in each partition. By joining together all the approximated data sample sets $DS'[P_{d=1}(1)(i) \times P_{d=2}(1)(j) \times \ldots \times P_{d=k}(1)(q)]$ generated by the functionals $\Psi(1)(i,j,\ldots,q)$ applied to the partitions P(1), an approximated version of the level-0 residual matrix RR(0) is obtained, referred to as level-1 approximated matrix A(1).

According to an embodiment of the present invention, the functionals $\Psi(1)(i,j,\ldots,q)$ may be planes that linearly interpolate the data samples DS of the data sample set $DS[P_{d=1}(1)(i) \times P_{d=2}(1)(j) \times \ldots \times P_{d=k}(1)(q)]$. Different type of functionals, such as functionals corresponding to higher order interpolations can also be used. Making reference to the example at issue, twelve functionals $\Psi(1)(i,j)$ (i=1; j=1, 2, ... 12) are calculated, each one corresponding to a level-1 partition $P(1)(i,j)=P_1(1)(i=1) \times P_2(1)(j=1, \ldots, 12)$ corresponding in turn to traffic data samples DS sampled in a corresponding period of two hours of the day during a year. Then, using said twelve functionals $\Psi(1)(i,j)$, twelve corresponding approximated data sample sets DS'[P(1)(i,j)] are obtained.

The next phase of the method 100 according to an embodiment of the present invention (block 120) provides for calculating the difference between the level-0 residual matrix RR(0) and the previously calculated level-1 approximated matrix A(1). As a result of this operation, a so-called level-1 residual matrix RR(1) is obtained, which represents, according to an embodiment of the present invention, the traffic information content corresponding to the cellular network deprived of the information content relating to the level-1 characterization, i.e., the annual traffic trend each two hours.

Then, the previously described phases 110, 115, 120 can be reiterated (exit branch Y of block 125) starting from the previously calculated level-(n) residual matrix RR(n), so as to:
  subdivide the time scale corresponding to at least one k dimensions of the level-(n) residual matrix RR(n) according to a (n+1)-th time division (level-(n+1) time division) in such a way to group the time units thereof in respective level-(n+1) partitions $P_1(n+1)(i) \times P_2(n+1)(j) \times \ldots \times P_k(n+1)(q)$ of time units so as to further subdivide the traffic data samples DS in further corresponding traffic data sample sets $DS[P_1(n+1)(i) \times P_2(n+1)(j) \times \ldots \times P_k(n+1)(q)]$ (block 110).
  for each partition $P_1(n+1)(i) \times P_2(n+1)(j) \times \ldots \times P_k(n+1)(q)$, calculate a corresponding functional $\Psi(n+1)(i,j,\ldots q)$ and a corresponding approximated data sample set $DS'[P_1(n+1)(i) \times P_2(n+1)(j) \times \ldots \times P_k(n+1)(q)]$ using the corresponding functional $\Psi(n+1)(i,j,\ldots q)$, so as to obtain an approximated version of the level-(n) residual matrix RR(n), referred to as level-(n+1) approximated matrix A(n+1) (block 115).
  calculate the difference between the level-(n) residual matrix RR(n) and the calculated level (n+1) approximated matrix A(n+1), so as to obtain a level-(n+1) residual matrix RR(n+1). According to an embodiment of the present invention, the residual matrix RR(n+1) represents the traffic information content corresponding to the cellular network cleared of the information content related to the level-1, level-2, ..., level-(n+1) characterizations (block 120).

Since each level-(n) characterization is obtained by grouping the traffic data samples DS according to a respective (n)-th time division indicative of a specific traffic trend, the corresponding functionals $\Psi(n)(i,j,\ldots,q)$ result to be mathematical tools capable of efficiently approximating such specific traffic trend.

Making reference to the example at issue, after a level-1 characterization corresponding to the annual traffic trend each two hours, a level-2 characterization may be employed which corresponds to a forecast analysis directed to focus on the seasonal (i.e., every three months) traffic trend every two hours and a level-3 characterization which corresponds to a forecast analysis directed to focus on the monthly traffic trend every two hours. The level-2 characterization is obtained by grouping the 365 time units of the day time scale (days) corresponding to the first dimension (d=1) in 4 level-2 scale partitions $P_1(2)(i)$, (i=1, 2, 3, 4), each one comprising a number of time units (days) corresponding to three months, using at the same time for the second dimension (d=2) 12 level-2 scale partitions $P_2(2)(j)$ (j=1, 2, ..., 12) equal to the level-1 scale partitions $P_2(1)(j)$ (j=1, 2, ..., 12) previously employed in the level-1 characterization. The level-3 characterization is instead obtained by grouping the 365 time units of the day time scale (days) corresponding to the first dimension (d=1) in 12 level-3 scale partitions $P_1(1)(i)$, (i=1, 2, ..., 12), each one comprising a number of time units (days) corresponding to a month, using at the same time for the second dimension (d=2) 12 level-3 scale partitions $P_2(3)(j)$ (j=1, 2, ..., 12) equal to the level-1 scale partitions $P_2(1)(j)$ (j=1, 2, ..., 12) previously employed in the level-1 characterization.

After the last n-th iteration is completed (exit branch N of block 125), n approximated matrixes A(1), ..., A(n) and a level-(n) residual matrix RR(n) are obtained. The summation of the n approximated matrixes A(1), ..., A(n) and the level-(n) residual matrix RR(n) is equal to the starting level-0 residual matrix RR(0).

Since the generation of the residual matrix RR(n) corresponding to a generic level-(n) characterization is obtained by removing from the level-0 residual matrix RR(0) information content corresponding to specific traffic trends (i.e., a specific traffic trend per each level-(i) characterization (i=1 to n)), and since each one of said specific traffic trends mainly consists of intrinsic traffic component, the residual matrix RR(n) provides an indication of the traffic data samples DS comprising information content which has not been extracted in any of the previous level-i characterizations.

The next phase of the method 100 according to an embodiment of the present invention (block 130) provides for forecasting traffic data trends in future periods ahead of the ones during which the traffic data samples DS have been collected (i.e., outside of the window time defined by the time units employed for subdividing the time scales used in the calculation of the residual matrixes). For this purpose, projections outside the time window for a specific future traffic trend are made by exploiting the functionals $\Psi(n)(i,j,\ldots,q)$ that have been calculated in selected level-(n) characterizations corresponding to selected specific traffic trends.

According to an embodiment of the present invention, forecasting of traffic data trend in future periods is carried out by generating predicted data samples PDS corresponding to a time window outside the definition domain (i.e., outside the time window wherein the various time scales are defined) based on one or a combination of the following operations:

Extension: Once the functionals $\Psi(n)$ are known for a defined domain, predicted data samples PDS are generated by extending data sample DS outside said defined domain. This is obtained by applying the functionals $\Psi(n)$ to a partition interval that extends over the defined domain. Making reference to the example at issue, if a forecasting of the annual traffic trend for each group of eight quarter of hour (i.e., the traffic trend corresponding to the level-1 characterization of the example at issue) is desired, extrapolation along the day dimension can be performed by computing the functionals of the first level for days dimension exceeding the 365th day, representing future days with respect to the defined domain. By assuming that $\Psi(1)(i,j)=\alpha+\beta q+\gamma d$ is a planar function, in which q (j=1: 1<=q<=8; j=2: 9<=q<=16, ... ; j=12: 89<=q<=96) represents the quarter of hour and d the day of the year (1<=d<=365), year extrapolation is obtained by applying $\Psi$ to a partition corresponding to d>365.

Transposition: Predicted data samples PDS are generated by applying the functionals $\Psi(n)$ to a partition interval inside the defined domain, and then repositioning the results to a corresponding partition interval outside the defined domain. Making reference to the example at issue, data samples DS of a traffic data sample set DS[P(1)(i,j, ... q)] corresponding to a partition P(n)(i,j, ... q) corresponding to a month can be transposed (shifted) to a corresponding partition outside the definition domain, so that the behavior of the considered partition pertaining to the level n is replicated over the corresponding partition of the forecasted period.

Functional Transformation: Predicted data samples PDS are generated by modifying the functionals $\Psi(n)$ by means of a function, then said modified functionals are applied to a partition interval inside the defined domain, and then the results are repositioned to a corresponding partition interval outside the defined domain. Making reference to the example at issue, data samples DS of a traffic data sample set DS[P(1)(i,j, ... q)] can be multiplied by a scaling factor to represent particular decrease or increase effect over the projected period.

Making reference to the example at issue, by using combination of the above basic operation, the forecast of traffic data for a time period that exceeds for three months the time observation window where DS is defined, has been performed, by taking into account for an expected increase for seasonality (Seasonality Increase Factor S) and an extra increase in the second extrapolated month (Monthly Increase Factor M) due to local traffic increase:

1. Extension of functionals $\Psi(1)$ over the projected period: $366 \le d \le 366+3*30$ days for each partition P(1) (i,j, ... q) of level 1.
2. Transposition of the first functionals $\Psi(2)$ (i=1, j= 1, ... ,12) over the extrapolated partition $366 \le d \le 366+3*30$, after a Functional Transformation operation consisting of multiplying all data samples DS set determined by $\Psi(2)$ (i=1, j=1, ... ,12) by the Seasonality Increase Factor S.
3. Transposition of data sample DS set pertaining to the functionals $\Psi(3)$ (i=1, j=1, ... ,12) over the extrapolated partition $366 \le d \le 366+30$ and $\Psi(3)$ (i=3, j= 1, ... ,12) over the extrapolated partition $366+2*30 \le d \le 366+3*30$. Transpose the second functionals $\Psi(3)$ (i=2, j=1, ... ,12) over the extrapolated partition $366+30 \le d \le 366+2*30$, after a Functional Transformation operation consisting of multiplying all data samples DS set determined by the functionals $\Psi(2)$ (i=2, j=1, ... ,12) by the Monthly Increase Factor M.

Sum up the sample data DS set determined in points 1 to 3 and the sample data DS set of the relevant partition pertaining to the residual matrix RR(4) containing the random traffic component of the traffic.

The next phase of the method (block 140) provides for properly managing the cellular network according to the forecasted traffic data trend (in form of the predicted data samples PDS) calculated in the previous phase.

For example, if the forecasted traffic data trend provides for an increasing of the data volume and of the number of connected users in specific future periods, the cellular network may be managed in such a way to allocate more resources to the cells/nodes of the cellular network during said periods.

Figure 2:
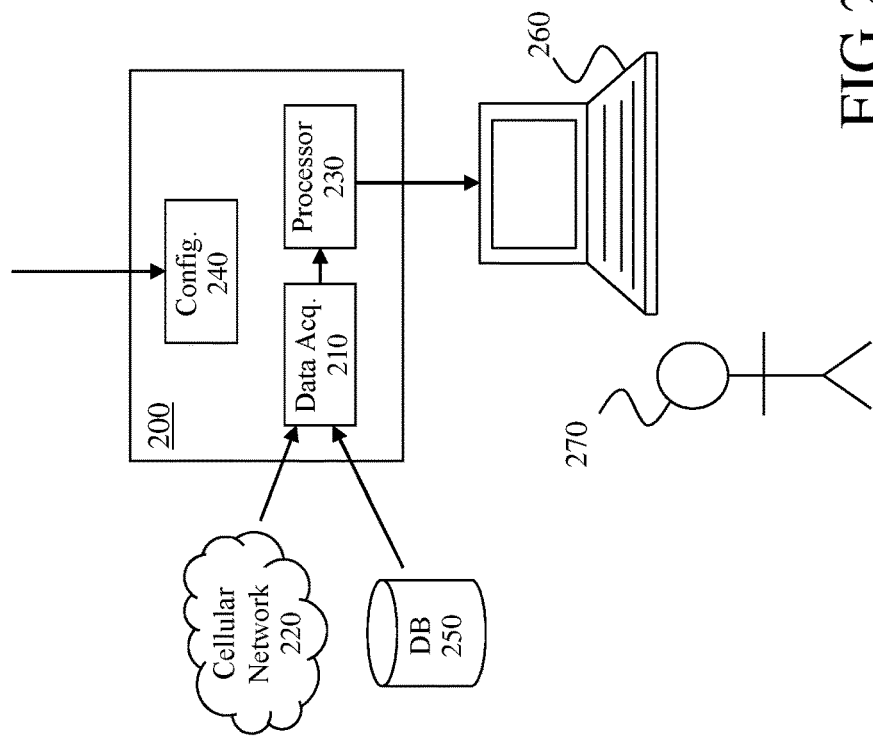
FIG. 2 illustrates in terms of functional blocks a system for the management of a wireless network according to an embodiment of the present invention.

The method 100 may be carried out by exploiting hardware and software resources, making use of a set of functionalities, data, program instructions, which resources may be located on a processor, such as a computer. For example, making reference to FIG. 2, a forecast unit 200 comprises a data acquisition module 210 coupled with cells/nodes of a cellular network 220 for sampling and acquiring traffic data samples DS therefrom and a processor 230 adapted to process the acquired traffic data samples DS by carrying out the phases of the method 100 previously described for outputting forecast future traffic trends. The forecast unit 200 further comprises a configuration module 240 adapted to receive configuration commands indicative of at least one among:

the frequency with which the traffic data samples DS are acquired and memorized (e.g., weekly or monthly);
the portion of the cellular network 220 to be monitored (e.g., a list of cells/nodes);
the forecasting target (e.g., the type of traffic trend to be forecasted, such as the annual traffic trend every two days);
the time window wherein the forecasting is carried out.

In alternative to or in addition to being coupled with cells/nodes of a cellular network 220 for sampling and acquiring traffic data samples DS therefrom, the data acquisition module 210 may be (also) coupled with a database 250 for acquiring historical traffic data samples DS stored in the latter.

The forecasted traffic data trends output by processor 230 are then provided to a local or remote terminal 260, for the consultation by a wireless network planner 270, in such a way that the latter may take advantage of the received forecasted traffic data trends for planning the management of the wireless network.

In the following of the present document, there will be presented an example of application of the proposes method 100.

EXAMPLE

Application to Traffic Data Samples Generated by a Cellular Network and Prediction The days are coded by associating the number 0 to the first observation day, the quarter hours are coded by associating the number 0 to the quarter hour going from 00:00 to 00:15, and by associating the number 95 to the quarter hour going from 23:45 to 00:00.

$X=x \in N; x_i \le x \le x_f; x_i=0; x_f=N-1$
$Y=y \in N; y_i \le y \le y_f; y_i=0; y_f=95$

In order to highlight the nature of the data a 3-level characterization will be employed, plus the initial level:

1: Level 0: original data: single partition on the day axis [{0 ... N−1}] and single partition on the quarter hour axis [{0 ... 95}]. In this situation, by supposing for example that the number of days corresponds to an observation year, N=365 (366).

2: Level 1: annual trend: single partition on the day axis [{0 ... N−1}] and partition by pair of hours on the quarter hour axis, i.e., the 96 quarter hours are grouped in groups of eight quarter hours [{0 ... 7}, {8 ... 15}, ..., {88 ... 95}]. In this situation, by supposing that the number of days correspond to an observation year, there is a single partition for X and 12 partitions for Y.

3: Level 2: seasonal trend: three-monthly partition, corresponding to the seasonality, on the day axis [{0 ... $S_1$−1}, {0 ... $S_2$−1}, ..., {0 ... $S_4$−1}], wherein $S_\#$ may assume a value comprised between 89 and 92 based on the three months taken into consideration. Partition by pair of hours on the quarter hour axis, i.e., the 96 quarter hours are grouped in groups of eight quarter hours [{0 ... 7}, {8 ... 15}, ..., {88 ... 95}]. In this situation, by supposing that the number of days correspond to an observation year, there are 4 partitions for X and 12 partitions for Y.

4: Level 3: monthly trend: monthly partition on the day axis [{0 ... $M_1$−1}, {0 ... $M_2$−1}, ..., {0 ... $M_{12}$−1}], wherein $M\#$ may assume a value comprised between 28 and 31 based on the month taken into consideration. Partition by pair of hours on the quarter hour axis, i.e., the 96 quarter hours are grouped in groups of eight quarter hours [{0 ... 7}, {8 ... 15}, ... {88 ... 95}]. In this situation, by supposing that the number of days correspond to an observation year, there are 12 partitions for X and 12 partitions for Y.

Each element of the Cartesian product X×Y is associated with a real number which represents the observed quantity and is the result of the sampling process.

In the telecommunication field, and particularly for a cellular network, the observed quantity may represent a traffic typology (for example voice traffic in Erlang, or data traffic volume in MBs) in the time interval defined on the coordinate Y.

A functional is defined for each partition $$\Psi = \beta_0 + \beta_x x + \beta_y y$$

Such functional $\Psi$ represents a plane; the coefficients $\beta_0$, $\beta_x$ and $\beta_y$ are calculated through a norm D which minimize the distance of the cloud of points of the pertaining partition according to a least square criterion. $\hat{R}_l$ is the approximation of the partition of the residual matrix RR through the functional $\Psi$ and is the reconstruction of the entire partition. Therefore, $\hat{R}_l$ represents the best possible approximation, based on the employed functional and based on the employed norm, for the partition.

By applying said methodology to RR(0), the lower level characterization is obtained both for the approximation and for the residual. In this case, with the settings of point 2 (Level 1), RR(1) is constituted by 12 planes having a length N=365 and an amplitude equal to 8 quarter hours, each of which being interpretable as annual trend for the sampled function over the pertaining partition. After performing all the points 1 to 4 the original residual matrix RR(0) can be represented in an expanded formulation as $$RR_0 = A(1)_{annual} + A(2)_{seasonal} + A(3)_{monthly} + RR(3) \quad (7)$$

FIGS. 3A-3G are graphical depictions in terms of grayscale indicative of the traffic distribution relating to the example at issue, wherein the horizontal axis corresponds to the day axis and the vertical axis corresponds to the quarter hour axis. More specifically, FIG. 3A shows the original representation of the annual traffic distribution; FIG. 3B corresponds to the annual trend of the first level; FIG. 3C corresponds to the residual of the annual trend; FIG. 3D corresponds to the seasonal trend of the second level; FIG. 3E corresponds to the residual of the seasonal trend; FIG. 3F corresponds to the monthly trend of the third level; FIG. 3G corresponds to the residual of the monthly trend.

Once the decomposition in terms of approximation matrixes A and residual matrixes RR are obtained, it is now possible to propagate outside the definition domain of RR(0) as previously described. Particularly, the propagation, in this case, is carried out to the purpose of forecasting future behaviors of the traffic topology.

Forecasts will be carried out according to the following passages:

1. Extension of the first lower level approximation matrix $A(1)_{annual}$ outside the observation interval for K subsequent ordered points of the X set (in this example K represents the number of days corresponding to the months—three in the example at issue and corresponding to a season-over which the propagation occurs). This passage implies that the propagated residual matrix will have the same annual trend of the starting residual matrix.
2. Unitary Functional Transformation and subsequent Shifting of the approximation matrix $A(2)_{seasonal}$ on the extended pertaining period. This passage implies that the propagated residual matrix will have the same seasonal trend of the residual matrix.
3. Unitary Functional Transformation and subsequent Shifting of the approximation matrix $A(3)_{monthly}$ on the extended pertaining period. This passage implies that the propagated residual matrix will have the same monthly trend of the residual matrix.
4. Unitary Functional Transformation and subsequent Shifting of the Level-4 residual matrix on the extended pertaining period. This passage implies that the propagated residual matrix will have the same trend of the lower level residual matrix (random component).

The definition domains become:

$$X_{propagated} = X + X_{extended} = x \in N; x_i \le x \le x_f; x_i = 0; x_f = N - 1 + 90 \quad Y = y \in N; y_i \le y \le y_f; y_i = 0; y_f = 95$$

FIGS. 4A-4B are graphical depictions in terms of grayscale indicative of the forecasted traffic distribution relating to the example at issue, wherein the horizontal axis corresponds to the day axis and the vertical axis corresponds to the quarter hour axis. More specifically, FIG. 4A is a map of the propagated Functional Representation for the points 1-3 and FIG. 4B is a completed propagated Functional Representation.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

The invention claimed is:

1. A method for managing a wireless network, comprising:
   collecting, by a processor, a sequence of traffic data samples ordered in time, and arranging said collected data samples in at least one level-0 residual matrix having at least one dimension, said dimension of said level-0 residual matrix corresponding to a respective time scale comprising an ordered sequence of time units, said ordered sequences of time units defining a first time window;
   performing, by the processor, at least once a cycle, each n-th iteration of the cycle, starting from n=0, comprising a sequence of phases A), B), C), D), E):
   A) for at least one dimension of a level-(n) residual matrix, subdividing the corresponding time scale in such a way to group the time units thereof in a respective level-(n+1) partition of time units so as to subdivide the traffic data samples in corresponding level-(n+1) traffic data sample sets;
   B) for each level-(n+1) traffic data sample set, calculating a corresponding functional which fits said level-(n+1) traffic data sample set;
   C) for each level-(n+1) traffic data sample set, calculating a corresponding approximation of the level-(n+1) traffic data sample set by applying the corresponding functional to the corresponding level-(n+1) partition of time units;
   D) joining together the approximations of the level-(n+1) traffic data sample sets to calculate a level-(n+1) approximated matrix, said level-(n+1) approximated matrix being an approximated version of the level-(n) residual matrix;
   E) calculating the difference between the level-(n) residual matrix and the calculated level-(n+1) approximated matrix so as to obtain a level-(n+1) residual matrix;
   forecasting, by the processor, traffic data trend in a second time window different from the first time window by generating predicted data samples by applying the calculated functionals to a partition of time units comprising an ordered sequence of time units corresponding to at least one among said second time window and said first time window; and
   allocating resources of the wireless network using said forecasted traffic data trend.

2. The method of claim 1, wherein said applying the calculated functionals to a partition of time units comprising an ordered sequence of time units corresponding to said second time window comprises:
   applying the functionals calculated for level-(n+1) traffic data sample sets corresponding to a selected n-th iteration of the cycle.

3. The method of claim 1, wherein said calculating a functional which fits a level-(n+1) traffic data sample set comprises calculating the functional through a norm criteria over the traffic data samples of said level-(n+1) traffic data sample set.

4. The method of claim 1, wherein said calculating a functional which fits a level-(n+1) traffic data sample set comprises interpolating the traffic data samples of said level-(n+1) traffic data sample set.

5. The method of claim 4, wherein said functional is a plane that linearly interpolate the traffic data samples of said level-(n+1) traffic data sample set.

6. The method of claim 1, wherein said generating predicted data samples comprises applying the functionals to a partition of time units that extends outside the first time window.

7. The method of claim 1, wherein said generating predicted data samples comprises applying the functionals to a partition of time units inside the first time window and then shifting the results to a partition of time units that extends outside the first time window.

8. The method of claim 1, wherein said generating predicted data samples comprises transforming the traffic data samples of level-(n+1) traffic data sample sets by applying a transformation function thereto.

9. The method of claim 8, wherein said transforming the traffic data samples of level-(n+1) traffic data sample sets comprises multiplying each traffic data sample of the level-(n+1) traffic data sample sets by a scaling factor.

10. The method of claim 1, wherein said traffic data samples comprise values of parameters associated with traffic managed by the wireless network.

11. The method of claim 10, wherein said parameters comprise at least one among:
    throughput;
    dropped-call rate;
    number of users connected to the wireless network, and
    data volume.

12. A system for the management of a wireless network, the system comprising:
    a data acquisition module configured to acquire traffic data samples;
    a processor configured to process the acquired data samples in order to generate predicted data samples; and
    a terminal configured to provide the generated predicted data samples,
    wherein to generate the predicted data samples, the processor is configured to:
    collect a sequence of traffic data samples ordered in time, and arranging said collected data samples in at least one level-0 residual matrix having at least one dimension, said dimension of said level-0 residual matrix corresponding to a respective time scale comprising an ordered sequence of time units, said ordered sequences of time units defining a first time window,
    perform at least once a cycle, each n-th iteration of the cycle, starting from n=0, comprising a sequence of phases A), B), C), D), E):
    A) for at least one dimension of a level-(n) residual matrix, subdivide the corresponding time scale in such a way to group the time units thereof in a respective level-(n+1) partition of time units so as to subdivide the traffic data samples in corresponding level-(n+1) traffic data sample sets,
    B) for each level-(n+1) traffic data sample set. calculate a corresponding functional which fits said level-(n+1) traffic data sample set,
    C) for each level-(n+1) traffic data sample set, calculate a corresponding approximation of the level-(n+1) traffic data sample set by applying the corresponding functional to the corresponding level-(n+1) partition of time units, D) join together the approximations of the level-(n+1) traffic data sample sets to calculate a level-(n+1) approximated matrix, said level-(n+1) approximated matrix being an approximated version of the level-(n) residual matrix, E) calculate the difference between the level-(n) residual matrix and the calculated level-(n+1) approximated matrix so as to obtain a level-(n+1) residual matrix, forecast traffic data trend in a second time window different from the first time window by generating predicted data samples by applying the calculated functionals to a partition of time units comprising an ordered sequence of time units corresponding to at least one among said second time window and said first time window, and allocate resources of the wireless network using said forecasted traffic data trend.

13. The system according to claim 12, wherein the data acquisition module is configured to sample and acquire the traffic data samples from the wireless network.

14. The system according to claim 12, further comprising:

a database configured to store historical traffic data samples, the data acquisition module being configured to acquire traffic data samples from said database.

* * * * *